United States Patent Office 3,740,252
Patented June 19, 1973

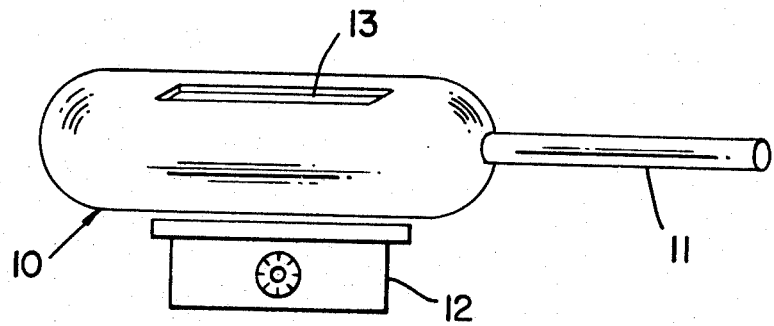
FIG_1
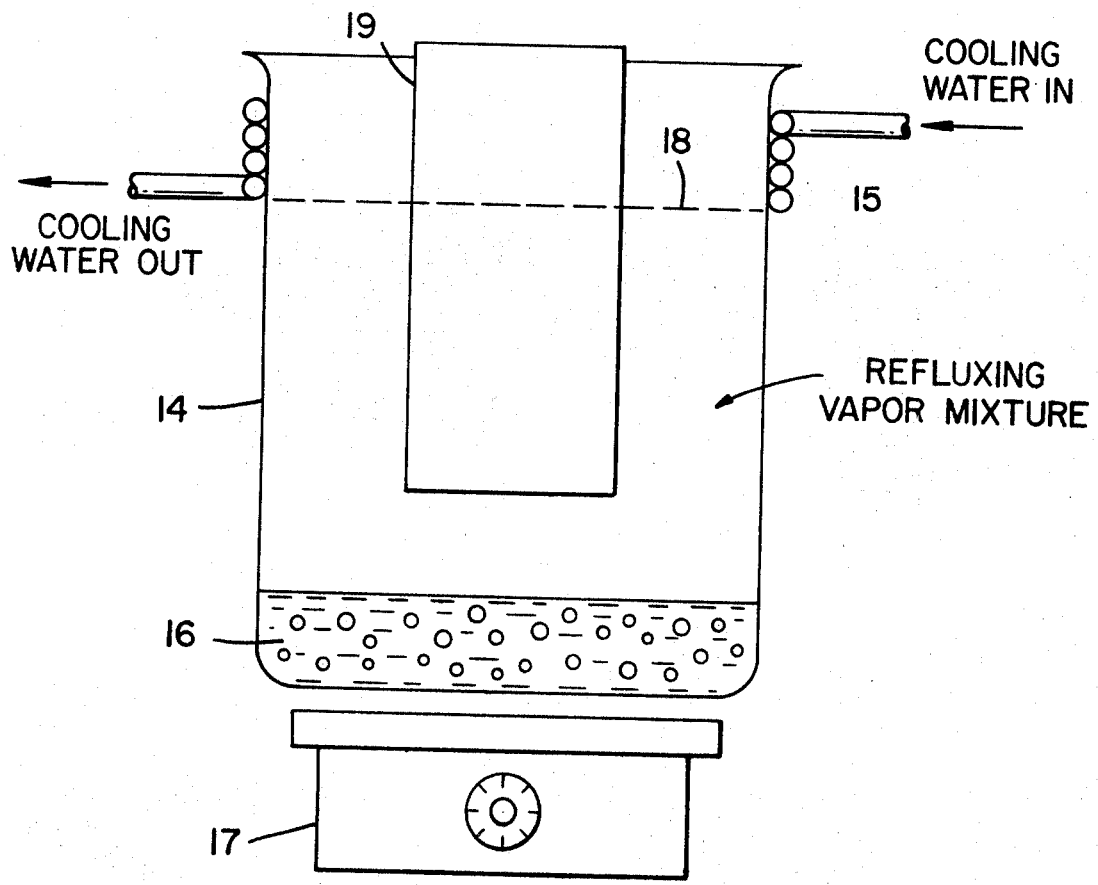
FIG_2

3,740,252
ADHESION OF ORGANIC MATERIALS TO
ORGANIC POLYMERS
Saul W. Chaikin, Menlo Park, Calif., assignor to Xidex
Corporation, Sunnyvale, Calif.
Filed Oct. 23, 1970, Ser. No. 83,551
Int. Cl. B44d 1/092, 5/04
U.S. Cl. 117—34                                    19 Claims

ABSTRACT OF THE DISCLOSURE

Treatment of organic polymers such as oriented polyethylene terephthalate film with the vapor phase of a halo-substituted fatty acid such as trichloroacetic acid to improve adhesion with organic materials. Typical is the improvement of the bond to organic polymeric vehicles used in making photographic film.

This invention relates to pretreating organic polymers to improve adhesion with organic materials.

The difficulties in obtaining good adhesion between an organic polymer and another organic material are well known in the art. In this regard considerable work has been done with polyethylene terephthalate film to improve its receptivity and adhesion to other organic materials. Thus, U.S. Pat. 2,703,290 teaches the introduction of an intermediate layer known as "subbing" to improve adhesion. It has also been proposed to flame treat the surface of the polymer for the same purpose. Another technique is to treat the polymer film with acid solutions such as sulfuric acid or chlorosulfonic acid; see U.S. Pat. No. 3,419,410. Good results have been obtained by subjecting polyethylene terephthalate film to a liquid solution of a halogenated fatty acid in a liquid organic solvent. The solvent is selected for its capability of wetting the surface of the film. Following treatment, the liquid phase halogenated acid and solvent are removed by heating. This procedure is described in U.S. Pat. No. 2,893,896.

An improvement upon the teachings of these patents and particularly the latter one has now been discovered. In the present invention the polymer to be pretreated is exposed substantially to the vapor phase only (as distinguished from the liquid phase) of a halo-substituted fatty acid sufficiently to improve the adhesion of the treated polymer to any other desired organic material. Wetting of the polymer surface is not required. Since the polymer treated is exposed to vapors, there is no need for subsequent removal of residual liquids. A simplification of the procedure in terms of time and equipment is thus obtained together with a savings in raw materials used in the pretreating steps. At the same time excellent adhesion is achieved which has been found to be applicable to almost all organic polymers which require such a pretreating step to improve adhesion to organic materials.

In general, adhesion may be improved by pretreating all organic polymers except polyolefins such as polyethylene and polypropylene and their fluorinated analogs such as polytetrafluoroethylene (Teflon) which appear to be too inert to be benefited by the treatment. Thus, suitable polymers which may be treated are polyesters, particularly oriented polyethylene terephthalate, vinyl polymers such as polyvinyl chloride, polyvinyl acetate, polyvinylidene chloride, polystyrene, polyvinylformal, and polyvinyl butyral, polymers formed from nitriles such as acrylonitrile, and methacrylonitrile, cellulose polymers, polyamides such as nylon, phenol-formaldehyde polymers, urea-formaldehyde polymers, melamine-formaldehyde polymers, and the like. The usual types of copolymers or cocondensates of the foregoing are similarly benefited.

When any of these diverse types of polymers are pretreated with the vapor phase of a halo-substituted fatty acid, their receptivity to any different organic material or polymer, i.e. different than the polymer being treated, will be improved. Frequently a different polymer will be brought into mutual contact with the pretreated polymer to form an adhesive bond therebetween. In the preferred embodiment a polymeric vehicle for a photographic film is adhered to the pretreated polymer. For example, a hydrophobic vehicle such as a vinyl resin or a thermoplastic linear poly (hydroxy ether) vehicle which may be used to incorporate a light-sensitive diazo compound is coated on a pretreated polyester support film for the manufacture of vesicular film. As will be shown in the examples hereinafter, the present improvement provides excellent adhesion between two such organic materials. In another typical application of the invention, the polymer to be pretreated, such as a polyester, is used as a support for organic-containing printing inks and adhesion therebetween is enhanced. In this regard conventional flexographic, rotogravure, offset, and silk-screen inks can be adhered to polyesters such as oriented polyethylene terephthalate.

In carrying out the process, any halo-substituted fatty acid may be employed although most commonly the halo-substitution will be either chlorine or fluorine. Most effective are those fatty acids containing halogen substitution in the alpha position. Suitable halogenated fatty acids for this invention include chloroacetic acid, dichloroacetic acid, trichloroacetic acid, chloropropionic acid, perfluorocaprylic acid, as well as those of higher molecular weight and having up to, for example, about 30 carbon atoms providing they can be vaporized under conditions such as temperature which do not adversely affect the polymer being treated with the vapor. Additionally, other substituents may be present in the fatty acid provided that in the particular application they do not have an adverse effect upon the polymer being treated. For practical purposes in most cases an alkanoic acid will be used containing chloro-substitution preferably in the alpha position.

The critical requirement of this invention is that the area of the polymer to be treated be exposed substantially to vapor phase only of the selected halo-substituted fatty acid. A relatively short period of exposure and contact will usually provide improved benefits. In general, a temperature of about 60–150° C. provides useful vapor pressure from the preferred halogenated fatty acids and an exposure or contact time of about .01–5 seconds results in good receptivity and adhesion of the treated polymer to other organic polymers and materials. Temperatures and exposure times are, however, relative matters. Generally, the higher the temperature of the vapor the shorter the exposure time needed to achieve a given improvement in receptivity and adhesion. Conversely, lower temperatures may result in reduced vapor pressure of the halo-substituted fatty acid and together with the reduced chemical reactivity at such lower temperatures longer periods of exposure may be required. Vapor pressure becomes higher and reaction times become shorter as the temperature increases, but the high temperature end is ultimately limited to that temperature at which the polymer being treated is adversely affected such as by softening or actual decomposition. For the preferred acid trichloroacetic acid, a temperature of about 80–130° C. and an exposure time of about .1–2 seconds provides excellent results with many of the polymers being treated.

In another aspect of the invention, substantial benefits can be obtained through ease of control of vapor temperatures and consistency of the concentration of the halogenated fatty acid vapor by combination of the fatty acid with a suitable solvent. In this aspect of the invention the selected halo-substituted fatty acid is heated together with a solvent to form combined vapors of the halo-substituted fatty acid and the solvent. The polymer to be treated is placed into the combination of these vapors and the improvements of the invention are obtained. In the preferred method, the fatty acid and solvent are heated under refluxing conditions so that substantially none of the acid or solvent is lost. At the same time the refluxing conditions provide precise and known conditions of temperature of the combined vapors and concentration of the halo-substituted fatty acid vapor. Easily repeatable results are obtained and a minimum of supervision over the equipment used is required in this embodiment.

Given a particular halo-substituted fatty acid to be used, the choice of solvent and the amount used will govern the temperature of the combined vapors and the concentration of fatty acid vapor therein in accordance with known principles. In some cases it may be advantageous to select a solvent which forms a solution that deviates from Raoult's Law so as to form a vapor phase with the fatty acid in which the fatty acid vapor is at a relatively higher concentration than in the liquid phase to thereby shorten exposure times.

Any solvent for the halo-substituted fatty acid which is relatively inert with respect to the polymer being treated may be used. However, it is advantageous to select a solvent of a lower boiling point than the fatty acid and which can be boiled with the fatty acid dissolved therein at a convenient temperature for treatment of the polymer under consideration. This permits use of refluxing conditions at a temperature that is not harmful to the polymer and which would not be possible if the fatty acid was used alone. Frequently, such solvents will be organic liquids such as halogenated hydrocarbons, for example trichloroethylene, and aromatic hydrocarbons, such as toluene which have a boiling point lower than the halo-substituted fatty acid being used.

To illustrate the invention the following examples are provided.

EXAMPLE I

Reference is made to FIG. 1 of the drawing for illustration of suitable apparatus which may be used to practice the present method. A hollow Pyrex cylinder 10 sealed at both ends and having a quarter inch wide slit 13 which is two inches long is fitted with a handle 11 which may be included for clamping the device in a secure position. A heating unit 12 is placed under cylinder 10. The cylinder 10 is filled one-third full with trichloroacetic acid. The apparatus shown is suitably placed in a hood and then heating unit 12 turned up to bring the trichloroacetic acid to a temperature of 85–95° C.

A strip of untreated oriented polyethylene terephthalate film was drawn slowly across slit 13 in abutting relationship with the slit so as to effectively seal the opening and minimize the escape of trichloroacetic acid vapor. The rate of movement of the polyester film across the slit was about one foot in ten seconds. Observing the film as it moved past split 13 showed the development of a coloration. No other physical change in the film was observed. Residues, droplets, powdered particles, and haze were all absent.

A polymeric photosensitive formulation suitable for use as a vesicular film was placed onto the treated polyester film. The formulation applied utilized as a vehicle a thermoplastic linear poly (hydroxy ether) of an epihalohydrin and a dihydricphenol. A polymer vehicle of this type is disclosed in copending U.S. Patent application Ser. No. 866,753, filed Oct. 15, 1969, now U.S. Pat. No. 3,622,333. The formulation applied in this example included a diazo compound as the photosensitive element. The polymeric formulation was cast from a solvent solution onto the film and cured in conventional fashion. The cured polymeric vehicle exhibited greatly improved adhesion to the trichloroacetic acid vapor treated polyester film. The bond strength of the coating to the base was greater than the cohesive strength of the coating.

Instead of the polyester film used above, a polystyrene film is treated in the same manner and application of the same vesicular film vehicle formulation shows equivalent improvements in adhesive strength. See U.S. patent application Ser. No. 50,888, filed June 29, 1970, for examples of polystyrene used as a vesicular film support which may be improved by this treatment.

EXAMPLE II

Reference is made to FIG. 2 of the drawing for suitable apparatus used in the practice of this example. With respect to FIG. 2, a two liter beaker 14 is provided with four coils shown generally at 15 of Tygon (quarter inch I.D.) wound around beaker 14 close to the lip. Ambient water was circulated through coils 15. A solution 16 was placed in beaker 14 to a depth which was less than a quarter of the beaker height. A few boiling chips were added to provide a smooth boiling action. Beaker 14 and solution 16 were heated by means of a hot plate 17 so as to maintain a boiling condition for solution 16. Because of the action of cooling coils 15 a refluxing condition was obtained. The vapors reached a maximum height to the line 18 with the materials used in solution 16 and at the temperature to be given.

The vapor-air interface at line 18 remained relatively static in these experiments. Thus, a thermometer placed just above line 18 registered a temperature close to ambient. When the thermometer was placed just below this line, a temperature close to the boiling point of solution 16 was observed.

The following three sets of materials were on separate occasions placed in beaker 14 to constitute solution 16 in the volume ratio shown:

(1) Trichloroacetic acid/trichloroethylene 1:1
(2) Trichloroacetic acid/tetrachloroethylene 1:2
(3) Trichloroacetic acid/toluene 1:2

Approximately 300 grams of each of the three solvent mixtures were used. Using the first combination a vapor temperature of 87° C. was noted. With the second mixture the vapor temperature was noted to be 122° C. The third mixture yielded a vapor temperature of 120° C.

Using each of the three trichloroacetic acid/solvent mixtures and at the vapor temperature given, a 3 mil. polyethylene terephthalate film section (Celanar 3000) was lowered into the vapor phase within beaker 14 as shown at 19 in FIG. 2. The film was held in the vapor for approximately one second, and was then rapidly removed. A thin film of condensed vapor appeared on the film surface while within the vapor phase within beaker 14 but rapidly evaporated off the film surface to give a dry film upon its removal from the vapor phase. Inspection of the treated film showed a surface haze indicating that the film had been effectively etched.

To illustrate the improved adhesion of film treated with each of the above three solutions, a vesicular film formulation was coated onto the treated polyester film. The same thermoplastic linear poly (hydroxy ether) vehicle referred to in Example I and containing a light-sensitive diazo compound was applied from a solvent mixture of methylethyl ketone and 2-methoxyethanol (3:5 by weight). The diazo compound was 6% by weight based on the vehicle solids. The polymer itself is present as a 18% by weight solution in the solvent mixture and was the commercial material known as Eponol 55. The vehicle and materials dispersed therein was coated onto the treated film to give a coating approximately ½ mil. in thickness. The coating was dried for five minutes at 105° C. Under such conditions where the polyester film has not been treated in accordance with this invention this coating has extremely poor adhesion. The coating can be peeled from the polyester very easily and, for instance, flexing of the coated film will cause inner layer adhesion failure and separation of the coating.

However, using the three strips of polyester film treated as above to receive the visicular film formulation resulted in coatings which could not be removed by the "Scotch" tape test. Extensive flexing of the coated film did not bring about any separation of the coating from the polyester base. Use of a razor blade to remove the coating was ineffective and in general the adhesive strength of the coating to the film base was greater than the cohesive strength of the coating.

This example illustrates a preferred technique for applying an organic material to a treated polymer in accordance with this invention. In general, mutual contact between the treated polymer and the organic material is accomplished by providing the organic material to be coated in a solvent and distributing the solvent into the treated polymer followed by removal of the solvent. Other techniques for contacting an organic material or polymer with a polymer treated in accordance with this invention are contemplated.

Instead of the Eponol vehicle used in this example, any other hydrophobic polymer known in the art for making vesicular film will exhibit the same excellent adhesion when used in accordance with this procedure. The Eponol as merely typical of this class of material. In addition, instead of a polymeric material of the type used in vesicular films, any other organic material or partially organic material could be substituted. For example, the polyester film treated in accordance with this example can be used to receive a flexographic printing ink such as Rotoflexo Red 1FG6773 made by Flint Ink Corporation.

What is claimed is:

1. A method for improving the adhesion of a first organic polymer to a different organic polymer selected from aromatic polymers and those aliphatic polymers containing at least one atom other than hydrogen, fluorine, and carbon comprising: exposing said different polymer with its surface substantially dry to substantially the vapor phase only of a halo-substituted fatty acid sufficiently to etch its surface and thereby improve the adhesion of said first polymer to said different polymer, and thereafter bringing said first polymer and said different polymer into mutual contact to form an adhesive bond therebetween.

2. A method in accordance with claim 1 wherein said mutual contact is accomplished by providing said first polymer in a solvent and distributing said solvent with said first polymer onto said different polymer.

3. A method in accordance with claim 1 wherein said different polymer is in a sheet form.

4. A method in accordance with claim 1 wherein the step of exposing said different polymer to said vapor comprises heating said halo-substituted fatty acid in combination with a solvent therefore to form a vapor phase including vapors of said halo-substituted fatty acid and said solvent, and placing said different polymer into the combination of said vapors.

5. A method in accordance with claim 4 wherein said solvent has a boiling point lower than said fatty acid and said halo-substituted fatty acid and said solvent are heated to produce the vapor phases thereof under refluxing condition.

6. The method in accordance with claim 1 wherein halo-substituted fatty acid is an alpha halo-substituted fatty acid.

7. The method in accordance with claim 6 wherein said vapor phase consists essentially of trichloroacetic acid.

8. The method in accordance with claim 1 wherein said different polymer is a polyester.

9. A method in accordance with claim 8 wherein said polyester is a high molecular weight oriented polyethylene terephthalate film.

10. A method in accordance with claim 8 wherein said first polymer is a vesicular film vehicle and contains a light-sensitive diazo compound.

11. A method in accordance with claim 10 wherein said vesicular film vehicle is a thermoplastic linear poly (hydroxy ether) of an epihalohydrin and a dihydricphenol.

12. In the method for pretreating an organic polymer other than aliphatic polyolefins and fluorinated analogs thereof in which the polymer is processed to improve its receptivity to coatings of organic materials, the improvement comprising: contacting said polymer with substantially the vapor phase only of a halo-substituted fatty acid for a time and at a temperature sufficient to impart a modification of the surface thereof consisting essentially of etching and thereby materially improve said receptivity.

13. The improved method in accordance with claim 12 wherein said halo-substituted fatty acid is chloro-substituted fatty acid and said vapor phase consists essentially thereof.

14. The improved method in accordance with claim 12 wherein said fatty acid is alpha chloro-substituted and has a vapor pressure below boiling at the temperature of the contact with said polymer, and including the step of adding a solvent for said fatty acid which produces a combined fatty acid-solvent vapor pressure greater than ambient pressure at the temperature of said contact with the polymer.

15. The improved method in accordance with claim 12 wherein said polymer is selected from the group consisting of high molecular weight oriented polyethylene terephthalate and polystyrene.

16. The improved method in accordance with claim 12 wherein said step of contacting said polymer with the vapor phase of said halo-substituted fatty acid is executed at a temperature of about 60–150° C. for about .01–5 seconds.

17. The improved method in accordance with claim 16 wherein said step of contacting said polymer with the vapor phase of said halo-substituted fatty acid is executed at a temperature of about 80–130° C. for about .1–2 seconds.

18. The improved method in accordance with claim 12 wherein said polymer is a support for a photosensitive layer.

19. The improved method in accordance with claim 12 wherein said polymer is a support for a printing ink.

References Cited

UNITED STATES PATENTS

| | | | |
|---|---|---|---|
| 3,578,484 | 5/1971 | Walles et al. | 117—47 A |
| 2,893,896 | 7/1959 | Beeber et al. | 117—138.8 F |
| 3,169,867 | 2/1965 | Brandt | 117—34 |
| 2,805,173 | 9/1957 | Ambler | 117—47 A |
| 3,062,674 | 11/1962 | Houck et al. | 117—34 |

FOREIGN PATENTS

| | | | |
|---|---|---|---|
| 994,094 | 6/1965 | Great Britain | 117—47 A |

RALPH HUSACK, Primary Examiner

W. R. TRENOR, Assistant Examiner

U.S. Cl. X.R.

117—47 A, 106 R, 118, 138.8 F, 138.8 R; 156—2, 3, 281, 332; 161—182, 231